United States Patent
Nakagawa

(10) Patent No.: US 12,493,448 B2
(45) Date of Patent: Dec. 9, 2025

(54) DATA PROCESSING SYSTEM, NON-TRANSITORY COMPUTER-READABLE STORAGE MEDIUM STORING DATA PROCESSING PROGRAM, AND METHOD FOR PRODUCING OUTPUT MATTER

(71) Applicant: SEIKO EPSON CORPORATION, Tokyo (JP)

(72) Inventor: Shota Nakagawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/633,606

(22) Filed: Apr. 12, 2024

(65) Prior Publication Data

US 2024/0345803 A1 Oct. 17, 2024

(30) Foreign Application Priority Data

Apr. 14, 2023 (JP) .................................. 2023-066297

(51) Int. Cl.
*G06F 7/08* (2006.01)
*G06F 16/14* (2019.01)

(52) U.S. Cl.
CPC .............. *G06F 7/08* (2013.01); *G06F 16/144* (2019.01)

(58) Field of Classification Search
CPC ..... G06F 7/08; G06F 16/144; H04N 1/00408; H04N 1/00206; H04N 1/00331; H04N 1/00411; H04N 1/00474; H04N 1/04; H04N 2201/0094
See application file for complete search history.

(56) References Cited

U.S. PATENT DOCUMENTS

| | | | |
|---|---|---|---|
| 7,889,359 B2 * | 2/2011 | Noda | G06F 40/126 199/40 |
| 11,704,431 B2 * | 7/2023 | Kraus | H04L 63/0414 726/26 |
| 2005/0289182 A1 * | 12/2005 | Pandian | G06Q 10/10 |
| 2006/0039707 A1 * | 2/2006 | Mima | G06F 3/121 399/24 |
| 2016/0266851 A1 * | 9/2016 | Kanamoto | G06F 3/1227 |
| 2017/0078502 A1 * | 3/2017 | Subana | H04N 1/00344 |
| 2018/0249037 A1 * | 8/2018 | Shono | H04N 1/32149 |
| 2019/0327381 A1 | 10/2019 | Nakagoshi | |
| 2021/0289086 A1 * | 9/2021 | Omuro | H04N 1/00488 |

FOREIGN PATENT DOCUMENTS

| | | | | |
|---|---|---|---|---|
| CN | 113986158 A | * | 1/2022 | ........... G06F 3/1204 |
| JP | 2013-050831 A | | 3/2013 | |
| JP | 2019-193051 A | | 10/2019 | |

* cited by examiner

*Primary Examiner* — Angelica Ruiz
(74) *Attorney, Agent, or Firm* — Global IP Counselors, LLP

(57) ABSTRACT

A data processing system includes a storage medium that stores a specified high-order word and a specified low-order word that includes the specified high-order word and is longer than the specified high-order word, and a processing section that performs processing in accordance with the specified high-order word when data includes the specified high-order word and does not include the specified low-order word, and performs processing in accordance with the specified low-order word instead of the specified high-order word when the data includes the specified low-order word.

8 Claims, 8 Drawing Sheets

FIG. 4

| SCAN-TO-BOX FUNCTION | | | b10 |
|---|---|---|---|
| CANCEL | GROUP PRINTING | OK | |

REGISTRATION LIST

| REGISTERED NAME | NUMBER OF SHEETS TO BE PRINTED |
|---|---|
| NUMBER OF SHEETS TO BE PRINTED FOR 1ST, GRADE, CLASS 1 | 30 |
| NOT REGISTERED | – |
| NOT REGISTERED | – |
| NOT REGISTERED | – |
| NOT REGISTERED | – |

⋮ ⋮

DELETE — b12
REGISTER/REWRITE — b11
STORE — b1

DATA PROCESSING SYSTEM, NON-TRANSITORY COMPUTER-READABLE STORAGE MEDIUM STORING DATA PROCESSING PROGRAM, AND METHOD FOR PRODUCING OUTPUT MATTER

The present application is based on, and claims priority from JP Application Serial Number 2023-066297, filed Apr. 14, 2023, the disclosure of which is hereby incorporated by reference herein in its entirety.

BACKGROUND

1. Technical Field

The present disclosure relates to a data processing system, a non-transitory computer-readable storage medium storing a data processing program, and a method for producing output matter.

2. Related Art

A technique for sorting scan data into a box based on a character string included in the scan data is known (for example, JP-A-2013-50831).

It is desirable to improve usability for processing acquired data.

SUMMARY

In order to solve the above-described problem, according to an aspect of the present disclosure, a data processing system includes a storage medium that stores a specified high-order word and a specified low-order word that includes the specified high-order word and is longer than the specified high-order word, an acquiring section that acquires data, a determining section that determines whether the acquired data includes the specified high-order word or whether the acquired data includes the specified high-order word and the specified low-order word, and a processing section that performs processing in accordance with the specified high-order word when the acquired data includes the specified high-order word and does not include the specified low-order word, and performs processing in accordance with the specified low-order word instead of the specified high-order word when the acquired data includes the specified low-order word.

In order to solve the above-described problem, according to another aspect of the present disclosure, a non-transitory computer-readable storage medium stores a data processing program for causing a computer to function as a receiving section that stores a specified high-order word and a specified low-order word that includes the specified high-order word and is longer than the specified high-order word to a storage medium, an acquiring section that acquires data, a determining section that determines whether the acquired data includes the specified high-order word or whether the acquired data includes the specified high-order word and the specified low-order word, and a processing section that performs processing in accordance with the specified high-order word when the acquired data includes the specified high-order word and does not include the specified low-order word, and performs processing in accordance with the specified low-order word instead of the specified high-order word when the acquired data includes the specified low-order word.

In order to solve the above-described problem, according to still another aspect of the present disclosure, a method for producing output matter includes storing a specified high-order word and a specified low-order word that includes the specified high-order word and is longer than the specified high-order word to a storage medium, acquiring data, determining whether the acquired data includes the specified high-order word or whether the acquired data includes the specified high-order word and the specified low-order word, and producing output matter processed in accordance with the specified high-order word when the acquired data includes the specified high-order word and does not include the specified low-order word, and producing output matter processed in accordance with the specified low-order word instead of the specified high-order word when the acquired data includes the specified low-order word.

BRIEF DESCRIPTION OF THE DRAWINGS

FIG. 4 is a diagram illustrating an example of a group printing setting screen.

DESCRIPTION OF EMBODIMENTS

Embodiments of the present disclosure are described in the following order.

1. Configuration of Multifunction Peripheral
2. Scanning Process
2-1. Specified Word Search Process
3. Other Embodiments

1. Configuration of Multifunction Peripheral

Figure 1:
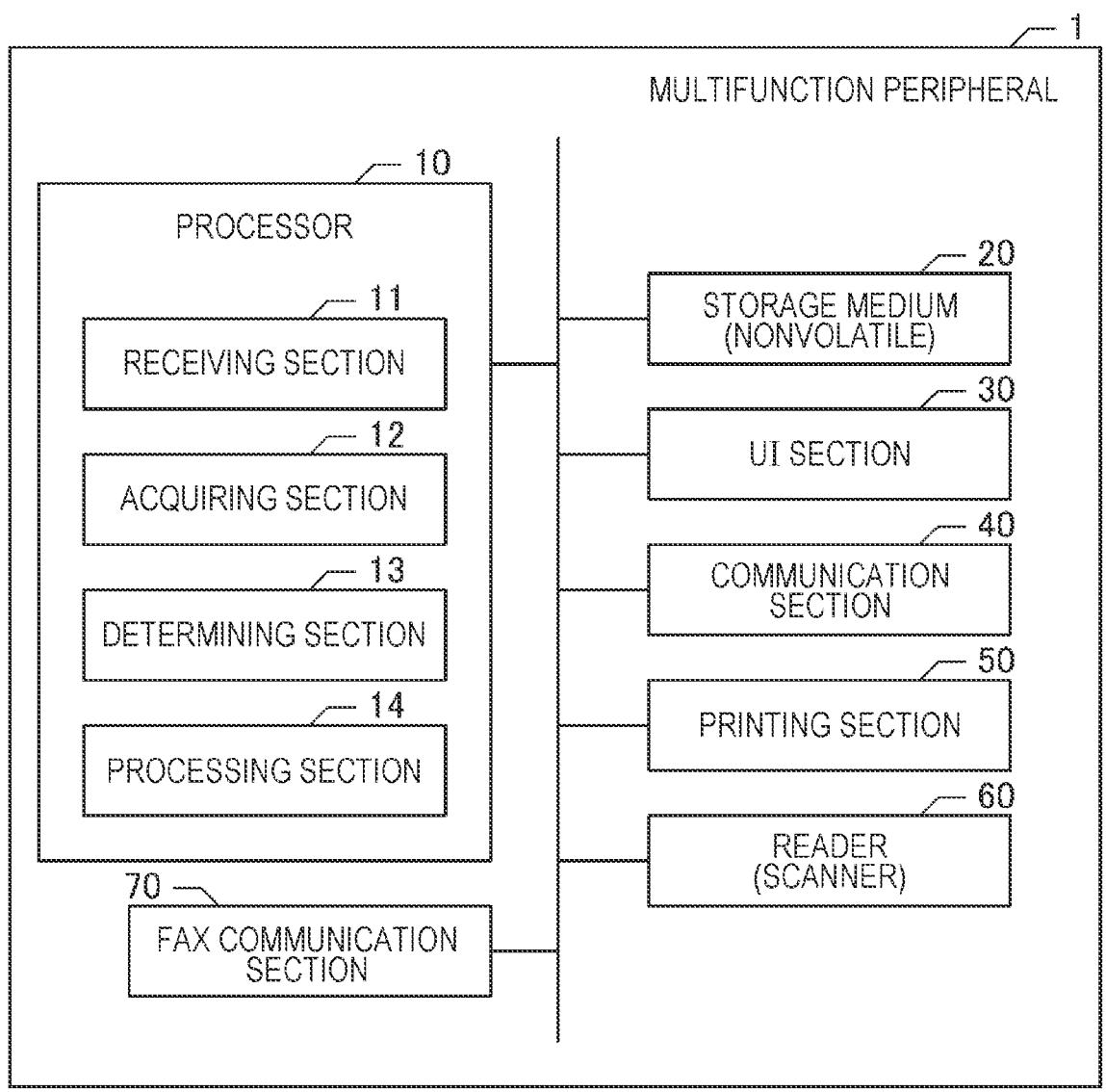
FIG. 1 is a block diagram of a multifunction peripheral.

FIG. 1 is a block diagram illustrating a configuration of a multifunction peripheral 1 as a data processing system according to an embodiment of the present disclosure. The multifunction peripheral 1 includes a processor 10, a nonvolatile storage medium 20, a user interface (UI) section 30, a communication section 40, a printing section 50, a reader 60, and a facsimile (FAX) communication section 70. The processor 10 includes a central processing unit (CPU), a read-only memory (ROM), and a random-access memory (RAM) that are not illustrated. The processor 10 can execute various programs stored in the storage medium 20 to control each of the sections of the multifunction peripheral 1. The processor 10 may be a single chip or a plurality of chips. For example, the processor 10 may include an application-specific integrated circuit (ASIC) instead of the CPU or may be configured such that the CPU and the ASIC cooperate with each other.

The UI section 30 includes a touch screen display. The touch screen display includes a display panel that displays various types of information based on control by the processor 10, and a touch detection panel overlapping the display panel. The touch screen display detects a touch operation by a person's finger or the like. The touch screen display outputs information indicating the touch operation to the processor 10. The processor 10 acquires the touch operation based on the information.

The communication section 40 includes various communication interfaces for communicating with another device via a cable or wirelessly. The communication section 40 includes an interface for communicating with various removable memories attached to the multifunction peripheral 1.

In the present embodiment, the printing section 50 includes an actuator, a sensor, a drive circuit, a mechanical component, and the like that perform printing on various printing media using at least one of various printing methods such as an inkjet method and an electrophotographic method. The reader (scanner) 60 includes devices that read an original set on original table glass or an original set on an ADF original tray and are, for example, an image sensor and a light source. The reader 60 further includes an actuator, a drive circuit, a sensor, a mechanical component, and the like that transport the original.

The FAX communication section 70 includes a modem that performs FAX communication of image data indicating the original via a public switched telephone network or the like, a circuit that detects or generates a control signal for transmitting and receiving the image data, and a circuit for encoding transmission data and decoding received data.

The multifunction peripheral 1 includes a scan-to-box function. The scan-to-box function is a function of storing image data generated by scanning to a folder specified by a user. The multifunction peripheral 1 further includes a function of sorting and storing a specified word. The function of sorting and storing a specified word is a function of scanning an image to recognize a character string and automatically sorting and storing image data to a folder associated with a specified word when the recognized character string includes the specified word. In the present embodiment, a function of not only storing image data to a folder associated with a specified word but also outputting the image data including the specified word in accordance with an output setting associated with the specified word is implemented. To implement the function of sorting and storing image data in accordance with a specified word and outputting the image data in accordance with an output setting associated with the specified word, the processor 10 can execute a data processing program (not illustrated) stored in the storage medium 20. The processor 10 functions as a receiving section 11, an acquiring section 12, a determining section 13, and a processing section 14 by executing the data processing program.

The receiving section 11 causes the processor 10 to implement a function of receiving a specified word and an output setting from the user, associating the received specified word with the received output setting, and storing the received specified word and the received output setting to the nonvolatile storage medium 20 in association with each other. The specified word is a key for searching a character group included in image data indicating a scanned image. The output setting is parameters of items for outputting the image data. The acquiring section 12 causes the processor 10 to implement a function of causing the reader 60 to operate in accordance with a scan setting to read the image and acquire the image data indicating the read image. The determining section 13 causes the processor 10 to implement a function of performing character recognition on the image data indicating the read image to recognize a character string and determining whether the recognized character string includes the specified word read from the storage medium 20. The processing section 14 causes the processor 10 to implement a function of outputting the image data in accordance with the output setting associated with the specified word when the specified word is included in the image data.

Figure 2:
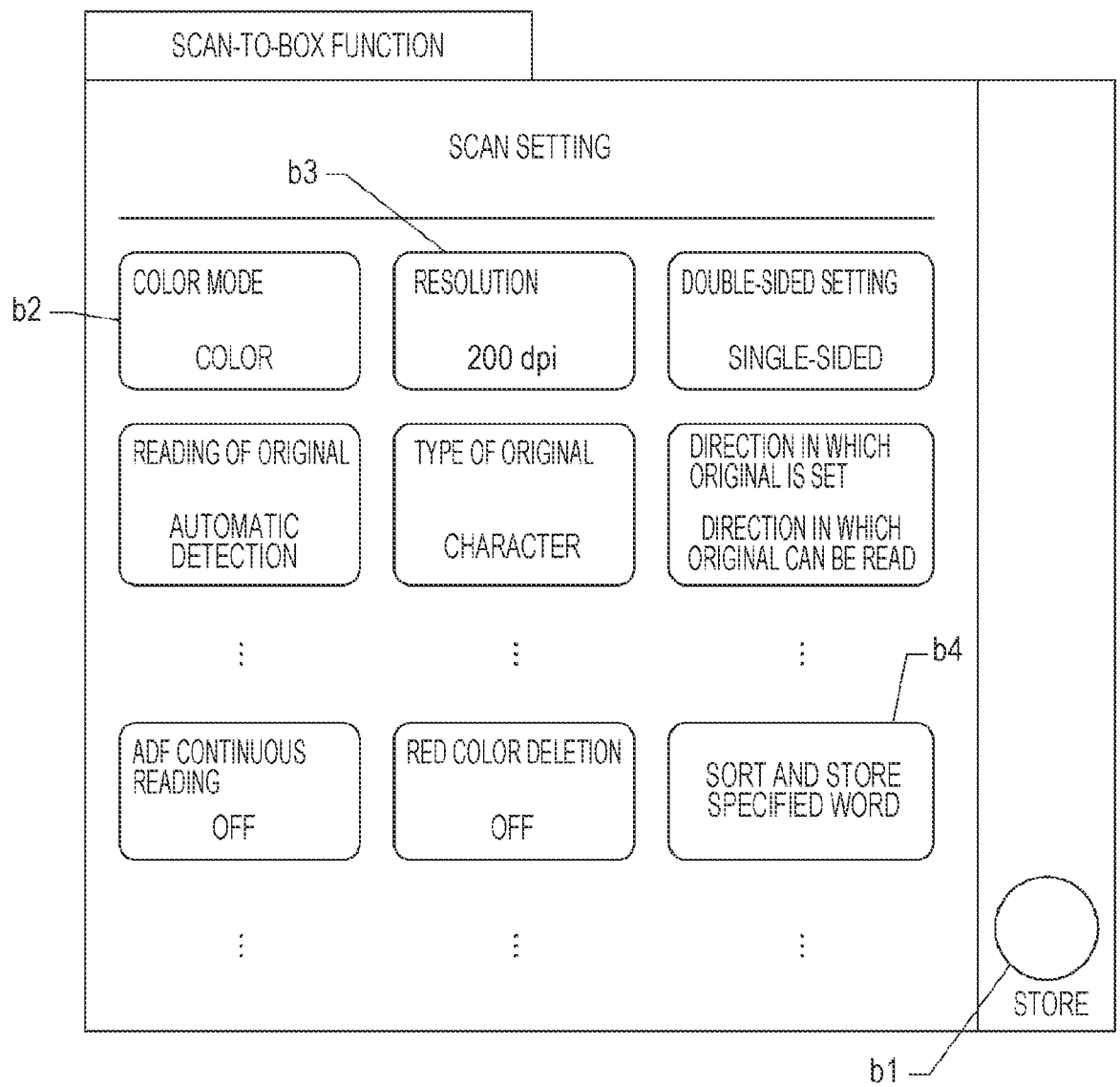
FIG. 2 is a diagram illustrating an example of a scan setting screen.

First, the output setting received from the user and the scan setting are described in detail. FIG. 2 is a diagram illustrating a scan setting screen when the scan-to-box function is selected. The processor 10 displays such a setting screen as illustrated in FIG. 2 on a display of the UI section 30 and receives the scan setting by the user. A range displayed at one time on the display of the UI section 30 and included in the scan setting screen illustrated in FIG. 2 is a range of a portion corresponding to the size of the display. The user can display the entire setting screen by moving a slider of a scroll bar not illustrated. However, to simplify the explanation, FIG. 2 illustrates each portion included in the setting screen.

The scan setting screen is a screen for setting values for various setting items for a scan operation. As illustrated in FIG. 2, buttons (b2, b4, and the like) for the various setting items are disposed on the scan setting screen. When the user operates these buttons, the user can display detailed setting screens corresponding to the buttons and select values to be set on the detailed setting screens. A store button b1 is a button for storing current set values and instructing to start scanning.

The scan setting includes a setting (color setting for scanning) for a color mode as indicated by the button b2. Options of values to be set in the color mode are monochrome, color, and gray scale. In addition, the scan setting includes a setting for a scanning resolution as indicated by the button b3. Furthermore, the scan setting screen includes the button b4 as illustrated in FIG. 2. The button b4 is a button for receiving detailed settings for the function of sorting and storing a specified word. When the button b4 is operated, the processor 10 displays a setting screen illustrated in FIG. 3.

Figure 3:
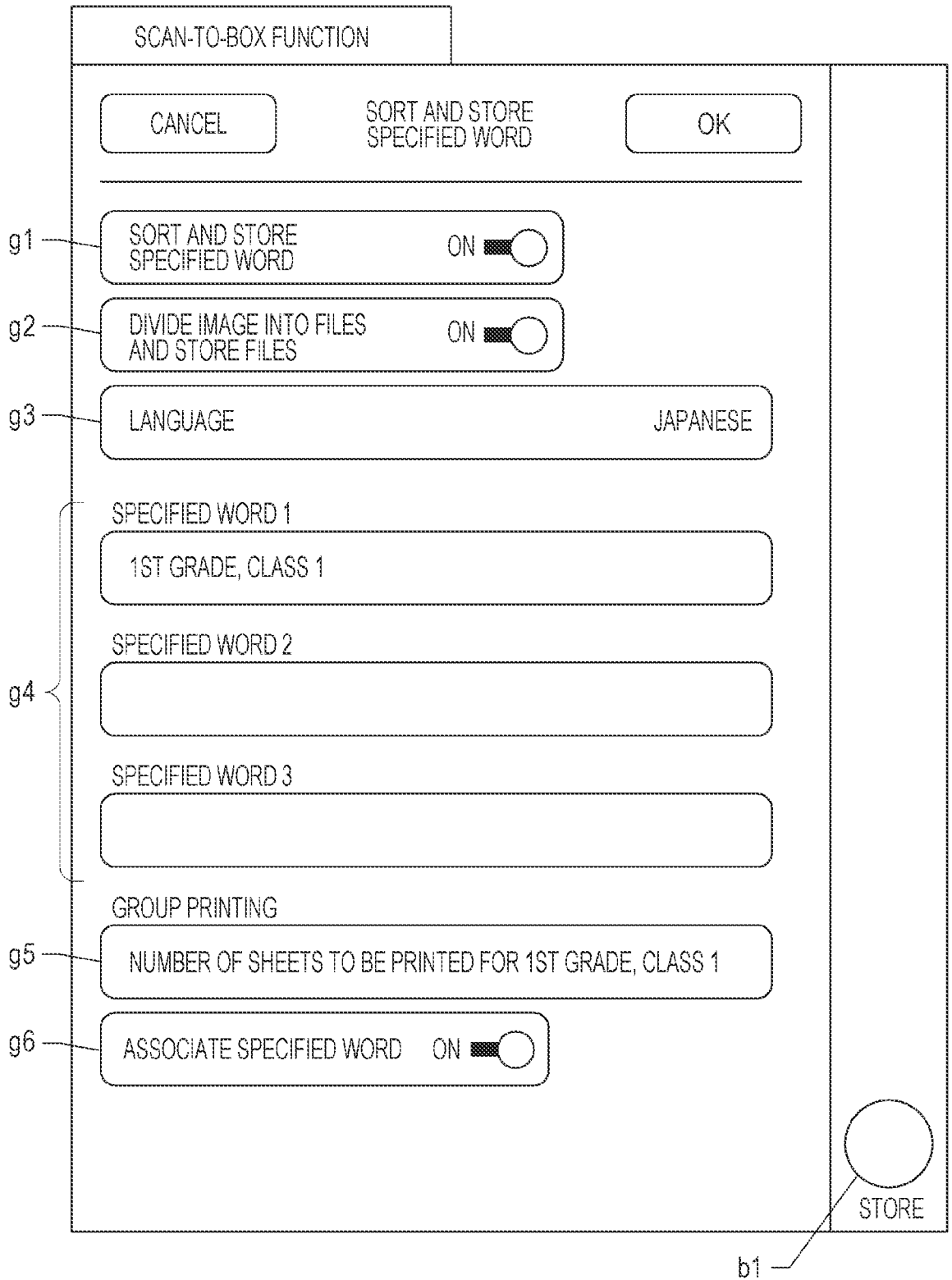
FIG. 3 is a diagram illustrating an example of a setting screen for sorting and storing a specified word.

FIG. 3 is a diagram illustrating an example of the setting screen for setting details of the function of sorting and storing a specified word. The processor 10 displays such a setting screen as illustrated in FIG. 3 on the display of the UI section 30 and receives a user's operation by the function of the receiving section 11. Similarly to FIG. 2 described above, to simplify the explanation, FIG. 3 collectively illustrates each portion included in the setting screen.

In the present embodiment, the setting screen illustrated in FIG. 3 includes a selection section g1, a selection section g2, a language setting section g3, a specified word entry section g4, a group printing setting section g5, a selection section g6, and a store button b1. The selection section g1 is an operation section for selecting ON or OFF of the function of sorting and storing a specified word. When the function of sorting and storing a specified word is ON, and a specified word is included in image data, the processor 10 determines that the function of storing the image data to a folder associated with the specified word is enabled.

The selection section g2 is a selection section for selecting ON or OFF of a function of dividing an image into files and storing the files. When ON is selected in the selection section g2, and image data generated by a single scan job includes a plurality of pages, the processor 10 divides the image data into files different for the respective pages and stores the files including the image data. When OFF is selected in the selection section g2, and the image data generated by the single scan job includes the plurality of pages, the processor 10 stores the image data of all the pages to a single file. That is, the processor 10 can receive, based on the selection section g2, units in which the image data is divided into different files. Since the selection section g2 is provided, the user can specify whether to store the image data to the files different for the respective pages or store the image data of all the pages to the single file. When the image data is divided into pages and the image data of the pages is stored, the user can determine whether files are required in units of files stored in a folder, and delete a file for image data of an unnecessary page.

The language setting section g3 is a setting section for setting a language of words included in an image to be scanned. The processor 10 receives specifying of a language of a specified word by the language setting section g3. The processor 10 performs, on the image data, character recognition associated with the language set in the language setting section g3. Therefore, the processor 10 can reduce a possibility that a character included in image data is erroneously recognized, as compared with a case where character recognition that is not associated with a language set in the language setting section g3 is performed on image data.

The specified word entry section g4 is an entry section for receiving an entry of a specified word. When the specified word entry section g4 is selected, and Japanese is selected, the processor 10 displays a software keyboard for Japanese syllabary, alphabets, numbers, symbols, and the like, and the user can operate the software keyboard to enter a desired character and perform kana-kanji conversion or the like so as to enter a specified word when necessary. In the present embodiment, it is possible to specify up to three words for image data read according to a single scan job. For example, when the same group (for example, the group may be assumed to be a school class or the like) is described in a document using different notations or different names, it can be expected that a plurality of specified words are set as a use case. More specifically, for example, as the plurality of specified words, "the 1st grade, class 1" described using the number, "the 1st grade, class 1" described using the Japanese numeral, and the name of a class teacher may be set.

The group printing setting section g5 is a setting section for receiving an output setting for image data. In the present specification, "group printing" indicates printing for the number of sheets registered in association with a specified word. In the present embodiment, it is assumed that output is a printing process. An output setting is a parameter for each setting item for printing image data, and includes a setting for the number of sheets to be printed. The output setting may include not only the number of sheets to be printed but also a setting for specifying a sheet feed tray and a setting for specifying a sheet ejection tray. The output setting may include a setting for printing quality and a setting for specifying color or monochrome. In the present embodiment, it is assumed that the user can use the group printing setting section g5 to set the number of sheets to be printed with image data including a specified word.

When the group printing setting section g5 is selected, the processor 10 displays a group printing setting screen for generating, editing, and deleting a registration list of the numbers of sheets to be printed. FIG. 4 is a diagram illustrating an example of the group printing setting screen. On the group printing setting screen, a name registered in the registration list of the numbers of sheets to be printed and the value of the number of sheets to be printed that is associated with the registered name are displayed. When the user newly enters a name to be registered and the number of sheets to be printed and operates a register/rewrite button b11 on the group printing setting screen, the registered name and the number of sheets to be printed that is associated with the registered name are stored in the storage medium 20 (see a list L1 illustrated in FIG. 5). When the user changes the registered name and the number of sheets to be printed that is associated with the registered name, and operates the button b11, the processor 10 updates the list L1 with the changed registered name and the changed number of sheets to be printed. When the user selects the registered name and operates a delete button b12 on the group printing setting screen, the processor 10 deletes the selected registered name and the number of sheets associated with the selected registered name from the list L1. When the user selects any of registered names displayed on the group printing setting section and operates an OK button b10, the user can specify the selected registered name associated with the number of sheets to be printed that is to be associated with a specified word.

Figure 5:
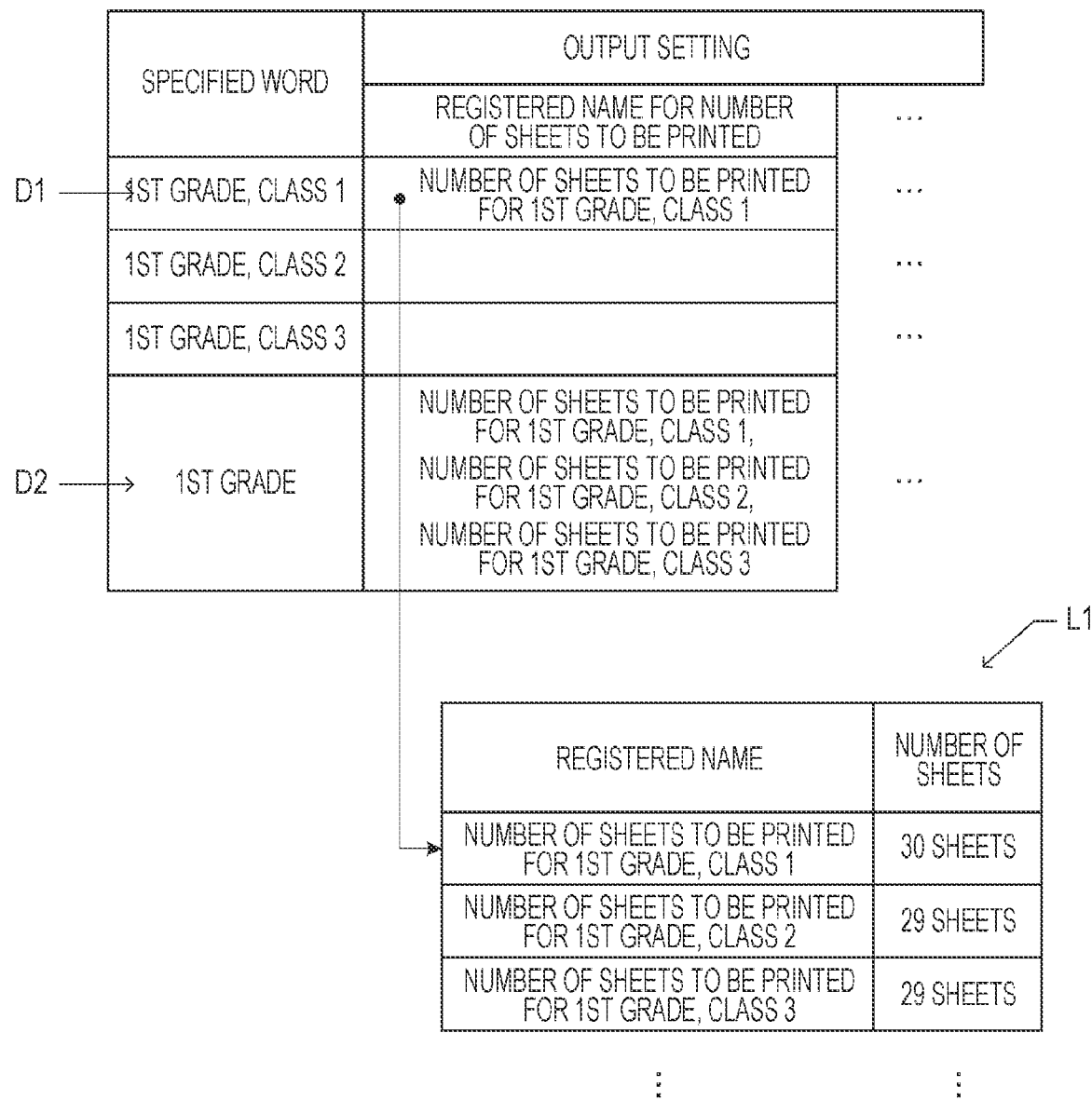
FIG. 5 is a schematic diagram illustrating an example of association relationships between specified words and output settings and an example of a registration list of the numbers of sheets to be printed.

For example, as illustrated in FIG. 3, when "the number of sheets to be printed for the 1st grade, class 1" is selected on the group printing setting screen as the number of sheets to be printed that is associated with a specified word that is "the 1st grade, class 1", the processor 10 associates "the number of sheets to be printed for the 1st grade, class 1" with "the 1st grade, class 1" as the specified word and stores "the number of sheets to be printed for the 1st grade, class 1" and "the 1st grade, class 1" to the storage medium 20 in association with each other as indicated by an association relationship D1 illustrated in FIG. 5. Thereafter, when "the 1st grade, class 1" is entered in the specified word entry section g4 on the setting screen illustrated in FIG. 3 again, the processor 10 may refer to the association relationship D1, automatically select "the number of sheets to be printed for the 1st grade, class 1" that is associated with "the 1st grade, class 1", and display "the number of sheets to be printed for the 1st grade" in the group printing setting section g5. The user may manually set, on the group printing setting screen illustrated in FIG. 4, a registered name associated with the number of sheets to be printed that is set in the group printing setting section g5 each time.

Next, as indicated in the list L1 illustrated in FIG. 5, an example is described in which the user sets the specified word entry section g4 and the group printing setting section g5 in order to newly perform printing of sheets for the entire 1st grade, for example, in a state in which 30 is registered as the number of sheets to be printed for the 1st grade, class 1, 29 is registered as the number of sheets to be printed for the 1st grade, class 2, and 29 is registered as the number of sheets to be printed for the 1st grade, class 3. In the example, there are the three classes, classes 1 to 3 in the "1st grade". The user enters the "1st grade" in the specified word entry section g4 illustrated in FIG. 3. Then, the user selects the group printing setting section g5 to display the group printing setting screen (illustrated in FIG. 4), selects "the number of sheets to be printed for the 1st grade, class 1", "the number of sheets to be printed for the 1st grade, class 2", and "the number of sheets to be printed for the 1st grade, class 3" from the registration list on the group printing setting screen, and operates the OK button b10 to associate "the number of sheets to be printed for the 1st grade, class 1", "the number of sheets to be printed for the 1st grade, class 2", and "the number of sheets to be printed for the 1st grade, class 3" with the specified word that is "the 1st grade" (see an association relationship D2). That is, a total of "88 sheets" that are "30 sheets"+"29 sheets"+"29 sheets" is associated as the number of sheets to be printed.

In this example, each of "the 1st grade, class 1", "the 1st grade, class 2", and "the 1st grade, class 3" is a specified low-order word of the specified word that is "the 1st grade". In other words, the "1st grade" is a specified high-order word of the specified words that are "the 1st grade, class 1", "the 1st grade, class 2", and "the 1st grade, class 3". Each of the specified low-order words includes the specified high-order word and is longer than the specified high-order word.

A specified high-order word may be automatically generated from a common part of a plurality of specified low-order words. For example, when two or more specified words that include a common part are registered, the processor 10 may automatically generate a specified high-order word from the common part of the plurality of specified low-order words. In this case, the user does not need to generate the specified high-order word and store the specified high-order word to the storage medium, and the usability is improved. In addition, when the specified high-order word is automatically generated, the processor 10 may inquire of the user whether to register the specified high-order word in the storage medium 20, and store the specified high-order word to the storage medium 20 when the user selects the registration. In addition, the processor 10 may automatically generate the above-described association relationship D2. Specifically, the processor 10 may treat the number of sheets to be printed that is associated with the specified high-order word as the total number of sheets to be printed for all the specified low-order words for the specified high-order word, associate the total number of sheets to be printed with the specified high-order word, and automatically generate the association relationship D2. Then, the processor 10 may inquire of the user whether to register the automatically generated association relationship D2 in the storage medium 20, and store the association relationship D2 to the storage medium 20 when the user selects the registration. Then, when the specified word that is "the 1st grade" is entered on the setting screen illustrated in FIG. 3, a registration list of the numbers of sheets to be printed that are associated with "the 1st grade" may be automatically displayed as a default in the group printing setting section g5. In this case, the user does not need to set the group printing setting section g5 for the specified high-order word each time.

The selection section g6 illustrated in FIG. 3 is a selection section for selecting ON or OFF of a function of associating a specified word. The function of associating a specified word is a function of associating a specified word with image data when the specified word is included in the image data. The specified word and the image data may be associated with each other in any method. For example, the image data may include the specified word as a part of a file name of a file (for example, a PDF file or the like) including the image data. Alternatively, the image data may include the specified word in an information part (for example, a header, a footer, or the like) of the file. Alternatively, the specified word may be described and stored in a file (for example, a file having a file name common to the file mane of the file including the image data) different from the file including the image data.

When the store button b1 illustrated in FIG. 3 is operated, the processor 10 associates a specified word with the number of sheets to be printed and stores the specified word and the number of sheets to be printed to the storage medium 20 in association with each other. That is, the association relationship D1 and the association relationship D2 illustrated in FIG. 5 are stored in the storage medium 20. In addition, when the store button b1 is operated in a state in which the group printing setting section g5 is already set, the processor 10 determines that a scan instruction was issued together with the scan setting, causes the image sensor to operate in accordance with the scan setting set on the scan setting screen illustrated in FIG. 2, performs scanning, performs character recognition on the image data, and performs printing on the number of sheets that is associated with the specified word.

That is, when the image data is generated by the reader 60, the processor 10 acquires the image data by the function of the acquiring section 12. Then, the processor 10 performs the character recognition on the image data by the function of the determining section 13. In the present embodiment, the character recognition is performed on the entire image data. The processor 10 performs character recognition corresponding to a language selected in the language setting section g3. The processor 10 acquires, for each character group determined as a single group (single word, single phrase, or the like), a candidate character string corresponding to the character group by performing character recognition using a model trained in machine learning for the character recognition. The processor 10 may acquire a plurality of candidate character strings for the same character group of image data. The processor 10 may acquire, for each of the acquired candidate character strings, a value indicating a probability that the character group is accurate. For example, as a candidate character string for a character group corresponding to "the 1st grade, 1 class 1" and a probability that the candidate character string is accurate, the processor 10 acquires recognition results that are ""the 1st grade, class 1", x %", ""the Ith grade, class I", y %", and ""the Nth grade, class N", z %". In the present embodiment, it is assumed that the larger the value of the probability that the candidate character string is accurate with respect to the character group, the higher the probability.

When a condition described later is satisfied, the processor 10 determines that the image data includes a specified word. The processor 10 changes a condition for determining whether the image data includes the specified word according to the scan setting. That is, when scanning is performed by a function of the determining section 13 in accordance with the scan setting in which the accuracy of the character recognition is set to a low level, the processor 10 relaxes the condition, as compared with a case where scanning is performed in accordance with the scan setting in which the accuracy of the recognition is set to a high level that is higher than the low level. In this case, it is possible to reduce a possibility that the specified word is not recognized even in image data scanned in accordance with the scan setting in which the accuracy of the recognition is low.

Specifically, for example, the processor 10 determines whether a candidate characteristic string that is obtained as a recognition result and is accurate with a probability equal to or higher than a threshold matches the specified word. The threshold when low-resolution scanning is performed at a low resolution is lower than the threshold when high-resolution scanning is performed at a high resolution. The threshold when the low-resolution scanning is performed is TL, and the threshold when the high-resolution scanning is performed is TH (>TL). For example, the processor 10 determines whether a candidate character string that is accurate with a probability of 80% or more matches the specified word when the high-resolution scanning is performed. For example, the processor 10 determines whether a candidate character string that is accurate with a probability of 70% or more matches the specified word when the low-resolution scanning is performed. In this case, when the same image is scanned at the low resolution, the processor 10 can acquire a larger number of candidate character strings as targets to be determined whether to match the specified word than the number of candidate character strings acquired when the same image is scanned at the high resolution. In addition, when the same image is scanned at the low resolution, the processor 10 can determine whether a larger number of candidate character strings match the specified word than the number of candidate character strings acquired when the same image is scanned at the high resolution. Therefore, it is easy to acquire a candidate character string that matches the specified word even when the low-resolution scanning is performed. As a result, it is possible to reduce a possibility that the specified word is not recognized even when the low-resolution scanning is performed.

The processor 10 determines that a candidate character string matches a specified word, and determines that the specified word is included in image data when the number of characters that are included in the candidate character string and do not match the specified word is equal to or smaller than a predetermined number of characters. The predetermined number of characters when the low-resolution scanning is performed is larger than the predetermined number of characters when the high-resolution scanning is performed. The predetermined number of characters when the low-resolution scanning is performed is NL, and the predetermined number of characters when the high-resolution scanning is performed is NH (<NL). For example, when the specified word is a word of 4 characters, the low-resolution scanning is performed, and at least three characters that are included in the candidate character string matches the specified word (the number of characters that are included in the candidate character string and do not match the specified word is 1), the processor 10 determines that the candidate characteristic string matches the specified word. Meanwhile, when the specified word is a word of 4 characters, the high-resolution scanning is performed, and the four characters that are included in the candidate character string matches the specified word (the number of characters that are included in the candidate character string and do not match the specified word is 0), the processor 10 determines that the candidate characteristic string matches the specified word. In this case, it is possible to reduce a possibility that the specified word is not recognized even when the low-resolution scanning is performed.

The processor 10 may be configured to determine that the candidate character string matches the specified word when the match rate between the candidate character string and the specified word is equal to or higher than a predetermined value. In this case, the predetermined value when the low-resolution scanning is performed is lower than the predetermined value when the high-resolution scanning is performed. When the number of characters of the specified word is X, the match rate is the degree to which a character string that has X continuous characters among X or more characters included in the candidate character string matches the specified word.

A plurality of different specified words may be stored in the storage medium 20. For example, it is assumed that a first specified word and a second specified word are stored in the storage medium 20. When a first candidate character string that is accurate with a probability of a first value matches the first specified word, a second candidate character string that is accurate with a probability of a second value matches the second specified word, and the first value is larger than the second value, the processor 10 selects the first specified word as a specified word included in image data. When the first candidate character string that is accurate with the probability of the first value matches the first specified word, the second candidate character string that is accurate with the probability of the second value matches the second specified word, and the second value is larger than the first value, the processor 10 selects the second specified word as a specified word included in the image data. Specifically, for example, the first specified word is "the 1st grade", the second specified word is "the 2nd grade", and a probability that a target character group in the image data is "the 1st grade" is higher than a probability that the target character group in the image data is "the 2nd grade", the processor 10 selects "the 1st grade" that is the target character group with the higher probability as a specified word included in the image data. On the other hand, when the probability that the target character group in the image data is "the 1st grade" is lower than the probability that the target character group in the image data is "the 2nd grade", the processor 10 selects "the 2nd grade" that is the target character group with the higher probability as the specified word included in the image data. Since the processor 10 selects a candidate character string that is a target character group with a higher probability, it is possible to reduce a possibility that extraction of a specified word may fail.

The processor 10 may perform character recognition on image data indicating an image by the function of the determining section 13 to recognize a character string, and may output the image data and a candidate character string that is a candidate for the recognized character string. For example, the processor 10 displays the image data subjected to the character recognition on the display of the UI section 30. When the user selects a desired character of the image data by, for example, touching the desired character, the processor 10 displays, on the display, a plurality of candidate character strings corresponding to a character group including the selected character. The processor 10 outputs a candidate character string that is accurate with a probability equal to or higher than the threshold. The threshold when the low-resolution scanning is performed is lower than the threshold when the high-resolution scanning is performed. As a result, the number of candidate character strings presented to the user when the same image is scanned at the low resolution is larger than the number of candidate character strings presented to the user when the same image is scanned at the high resolution. When the user selects an accurately recognized character string from among candidate character strings, the processor 10 determines the candidate character string selected by the user as a character string indicating a character group selected from the image data by the user. The processor 10 may determine whether the determined character string matches the specified word.

In the above-described manner, the processor 10 determines whether the image data includes the specified word. When the specified word is included in the image data, the processor 10 prints the image data in accordance with an output setting by the function of the processing section 14, and stores the image data to a generated folder with the specified word as a folder name. The image data is stored to the folder when scanning is performed in a state in which the selection section g1 illustrated in FIG. 3 is set to ON.

Figure 6:
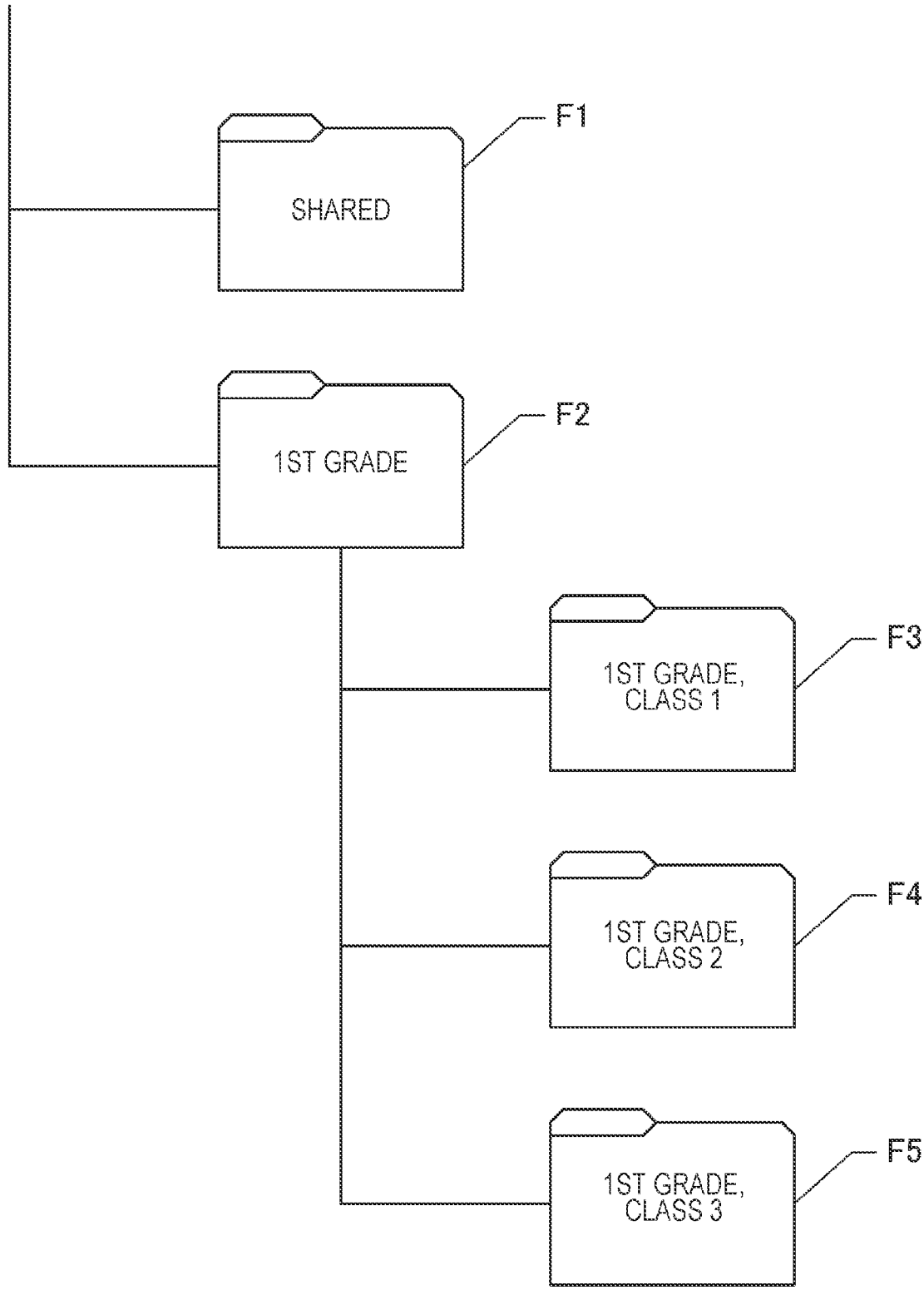
FIG. 6 is a diagram illustrating an example of a folder structure.

In the example illustrated in FIG. 5, each folder is provided in the storage medium 20 as illustrated in FIG. 6. A shared folder (also referred to as a shared box) F1 is a folder for storing image data not including any specified word. A "1st grade" folder F2 is a folder for storing image data that includes "the 1st grade" as the specified high-order word and does not include "the 1st grade, class 1", "the 1st grade, class 2, and "the 1st grade, class 3 that are the specified low-order words of "the 1st grade". A "1st grade, class 1" folder F3 is a folder for storing image data including "the 1st grade, class 1" that is the specified low-order word. A "1st grade, class 2" folder F4 is a folder for storing image data including "the 1st grade, class 2" that is the specified low-order word. A "1st grade, class 3" folder F5 is a folder for storing image data including "the 1st grade, class 3" that is the specified low-order word. As illustrated in FIG. 6, the "1st grade, class 1" folder F3, the "1st grade, class 2" folder F4, and the "1st grade, class 3" folder F5 may be generated as folders contained in the "1st grade" folder F2. When the folder structure is configured in the above-described manner, the user easily recognizes relationships between the specified high-order word and the specified low-order words.

The processor 10 stores the image data to the folder for the specified high-order word by the function of the processing section 14 and performs printing processing in accordance with an output setting for the specified high-order word when the image data includes the specified high-order word and does not include the specified low-order words. In addition, the processor 10 stores the image data to the folders for the specified low-order words and performs printing processing in accordance with an output setting for the specified low-order words instead of the specified high-order word when the acquired image data includes the specified low-order words.

In the present embodiment, the processing that is performed in accordance with the specified high-order word includes processing that is performed in accordance with all specified words that include the specified high-order word and are longer than the specified high-order word in principle. For example, when the three specified low-order words that are "the 1st grade, class 1", "the 1st grade, class 2", and "the 1st grade, class 3" for "the 1st grade" as the specified high-order word are present, all processing that is performed in accordance with the three specified low-order words is included in the processing that is performed in accordance with the specified high-order word. More specifically, for example, as illustrated in FIG. 5, when the number of sheets to be printed is set, the processor 10 sets the number of sheets to be printed with the image data including "the 1st grade" as the specified high-order word and not including the specified low-order words to 88 sheets=30 sheets+29 sheets+29 sheets. The processor 10 controls the printing section 50 to print the image data on 88 sheets. In this case, when the data includes the specified high-order word and does not include the specified low-order words, the user can cause the multifunction peripheral 1 to perform the processing in accordance with all the specified low-order words for the specified high-order word.

The processing that is performed in accordance with the specified high-order word may not include the processing that is performed in accordance with all the specified low-order words as an exception. In the example illustrated in FIG. 5, a list of the numbers of sheets to be printed for "the 1st grade" can be changed such that "the number of sheets to be printed for the 1st grade, class 1" and "the number of sheets to be printed for the 1st grade, class 2" are set and "the number of sheets to be printed for the 1st grade, class 3" is not set in the list of the numbers of sheets to be printed for "the 1st grade". In this case, processing to be performed in accordance with at least one of the specified low-order words can be performed on the image data that includes the specified high-order word and does not include the specified low-order words.

When the numbers of sheets to be printed are set as illustrated in FIG. 5, the processor 10 prints the image data including "the 1st grade, class 1" as the specified low-order word on 30 sheets that are the number of sheets to be printed that is associated with the specified low-order word that is "the 1st grade, class 1".

As described above, according to the present embodiment, the multifunction peripheral 1 can perform printing in accordance with an output setting associated with a specified word included in image data. Therefore, the user's effort can be saved and the usability is improved, as compared with a case where the user issues an output instruction (print instruction) for scanned image data and performs printing.

2. Scanning Process

Figure 7:
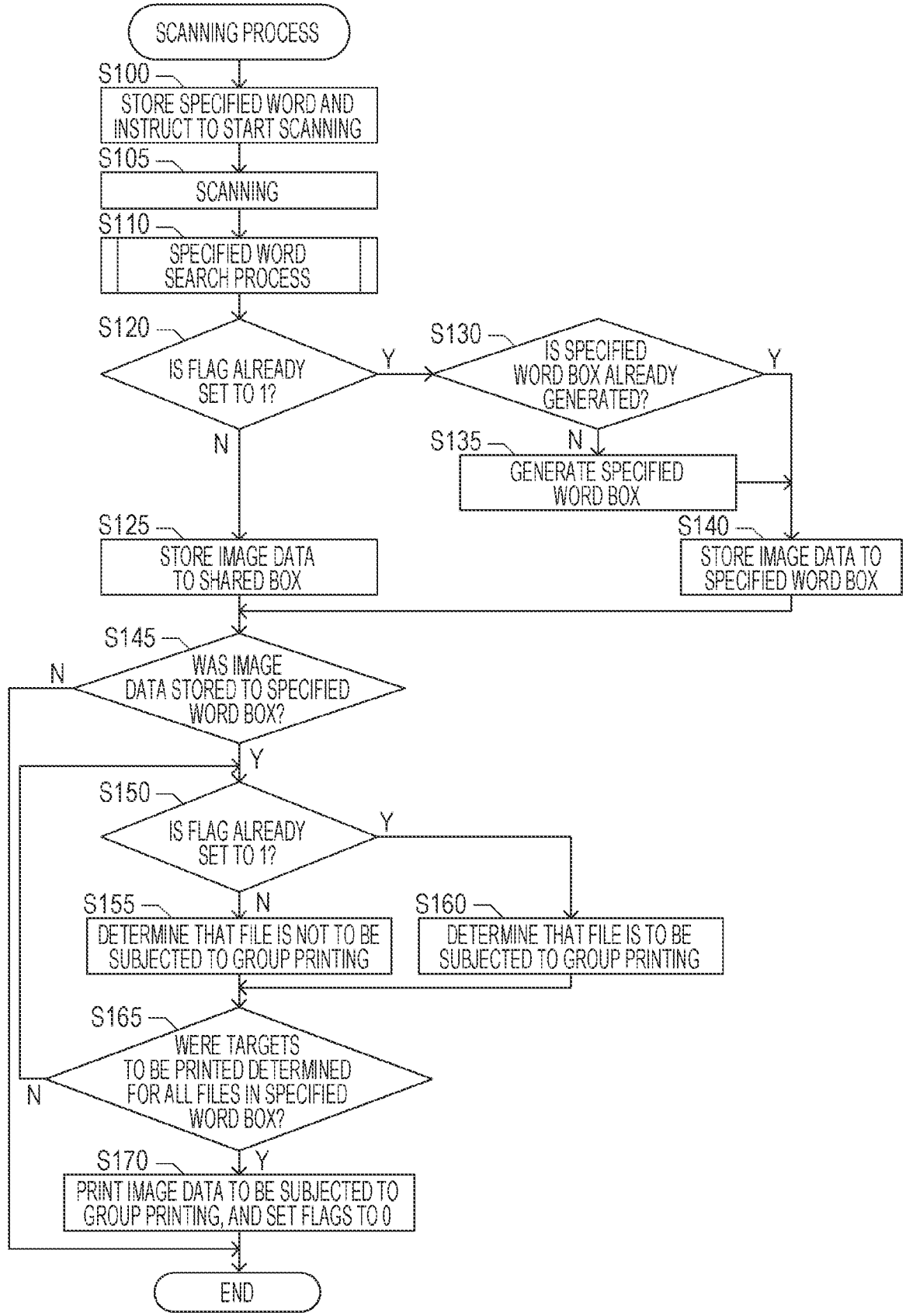
FIG. 7 is a flowchart of a scanning process.

FIG. 7 is a flowchart of a scanning process. The scanning process illustrated in FIG. 7 is performed when the store button b1 is operated in a state in which the scan setting is set on the scan setting screen illustrated in FIG. 2, the selection section g1 is set to ON on the setting screen illustrated in FIG. 3, at least one specified word is set, and any of lists of numbers of sheets to be printed is selected in the group printing setting section g5.

When the scanning process is started, the processor 10 stores the specified word and receives an instruction to start scanning (step S100). That is, the processor 10 associates the specified word entered in the specified word entry section g4 with a registered name set in the group printing setting section g5 and stores the specified word and the registered name to the storage medium 20 in association with each other (see, for example, D1 and D2 illustrated in FIG. 5). In addition, the processor 10 determines that the inspection to start scanning in accordance with the scan setting set on the scan setting screen illustrated in FIG. 2 was issued by the user. Then, the processor 10 advances the process to step S105.

The processor 10 performs scanning (step S105). That is, the processor 10 causes the image sensor to operate to perform the scanning and generates image data indicating an image in accordance with the scan setting set on the scan setting screen illustrated in FIG. 2.

Subsequently, the processor 10 performs a specified word search process (step S110). The specified word search process is a process of performing optical character recognition (OCR) on the image data generated as a result of the scanning and setting a flag when the specified word is detected. Details of the specified word search process are described later.

To store the image data generated in step S105 in a file in a predetermined file format (for example, PDF), the processor 10 associates a flag with each file. When image data included in the file includes the word specified in step S100, the flag for the file is set to 1. After the printing performed in accordance with the output setting associated with the specified word is completed, the flag for the file is set to 0. A flag for a file including image data not including the specified word remains 0.

Subsequently, the processor 10 determines whether the flag is already set to 1 (step S120). That is, the processor 10 determines whether the flag was set to 1 after the specified word search process. When the selection section g2 for the function of dividing an image into files and storing the files is ON, image data of a single page is treated as a single file.

When a plurality of files are generated, steps S120 to S140 are repeated for the number of files generated.

When the processor 10 determines that the flag is already set to 1 in step S120, the processor 10 determines whether a specified word box is already generated (step S130). That is, the processor 10 determines whether a folder corresponding to the word specified in step S100 is already generated and stored in the storage medium 20.

When the processor 10 determines that the specified word box is not generated in step S130, the processor 10 generates a specified word box (step S135) and stores the image data to the generated specified word box (step S140). That is, the processor 10 generates a folder with the specified word as a folder name and stores the file including the image data to the folder. When the processor 10 determines that the specified word box is already generated in step S130, the processor 10 stores the image data to the generated specified word box (step S140). That is, the processor 10 stores the file including the image data to the generated folder corresponding to the specified word.

When the processor 10 determines that the flag is not set to 1 in step S120, the processor 10 stores the image data to the shared box (step S125). That is, the processor 10 stores the file including the image data to the shared folder F1 (see FIG. 6).

After performing step S125 or step S140, the processor 10 determines whether the image data was stored in the specified word box (step S145). When the processor 10 determines that the image data was not stored in step S145 (when the image data is stored in the shared box), the processor 10 ends the scanning process.

When the processor 10 determines that the image data was stored in the specified word box in step S145, the processor 10 starts a process of group printing in steps S150 to S170. The process in steps S150 to S170 is performed on each of files stored in the folder corresponding to the specified word. That is, the processor 10 determines whether a flag for a file to be processed is already set to 1 (step S150). When the flag is already set to 1, the processor 10 determines that the file is to be subjected to the group printing (step S160). When the flag is not set to 1, the processor 10 determines that the file is not subjected to the group printing (step S155).

After performing step S155 or S160, the processor 10 determines whether targets to be printed were determined for all files in the specified word box (step S165). When the processor 10 determines that not all the targets to be printed were determined for all the files in the specified word box in step S165, the processor 10 returns the process to the processing in step S150. When the processor 10 determines that the targets to be printed were determined for all the files in the specified word box in step S165, the processor 10 prints image data to be subjected to the group printing, and resets flags (step S170). That is, the processor 10 controls the printing section 50 to perform printing based on the image data included in the files to be processed and the output setting associated with the specified word. Then, the processor 10 sets, to 0, the flags for the files on which the printing was completed.

2-1. Process of Searching for Specified Word

Figure 8:
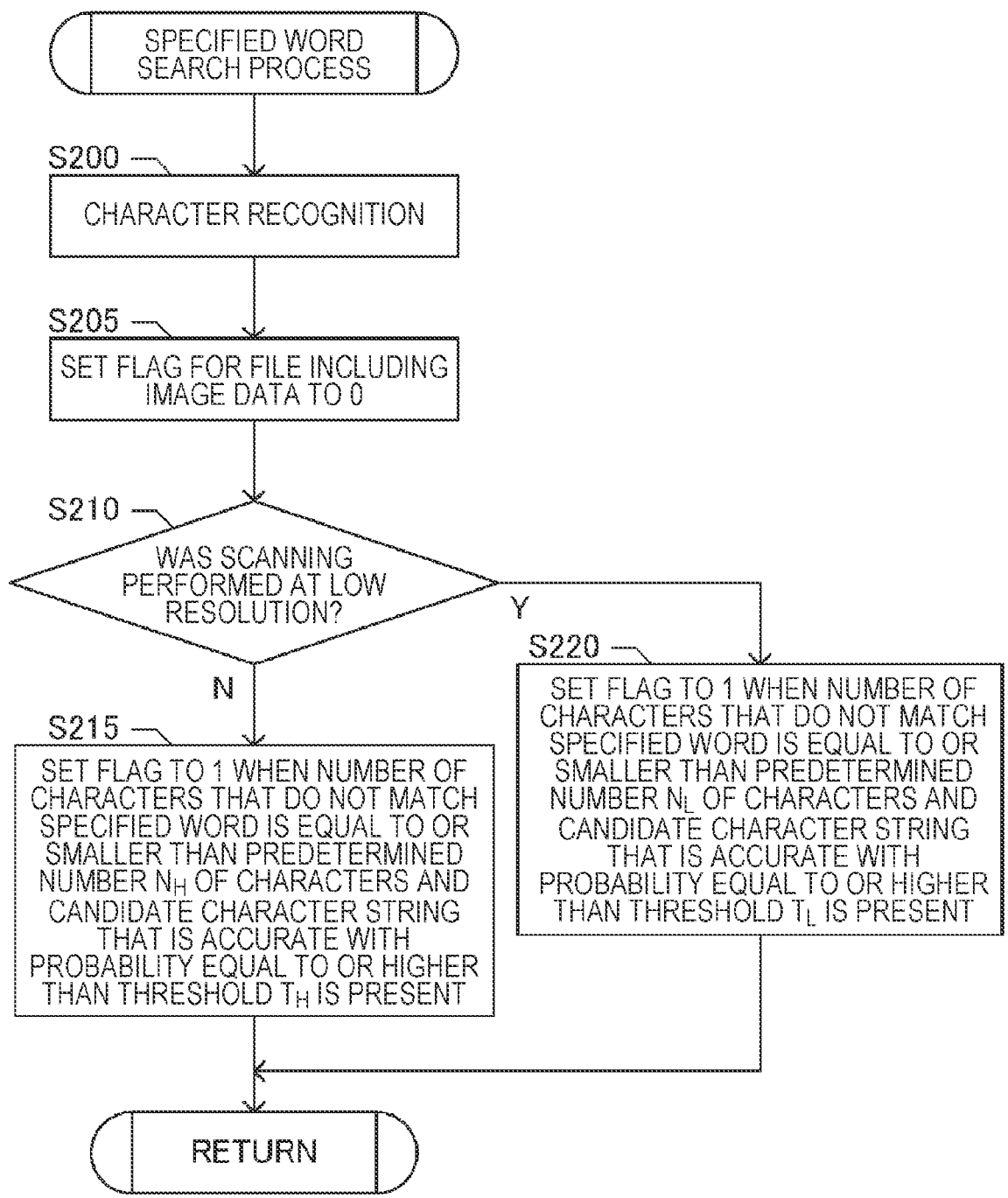
FIG. 8 is a flowchart of a specified word search process.

FIG. 8 is a flowchart illustrating the specified word search process performed in step S110 illustrated in FIG. 7. When the specified word search process is started, the processor 10 performs character recognition on the image data (S200). That is, the processor 10 performs the character recognition corresponding to a specified language for the entire image data, and acquires, for each unit estimated as a single word, a candidate character string and a value indicating a probability that the candidate character string is accurate.

Subsequently, the processor 10 sets the flag for the file including the image data to 0 (step S205). That is, the flag is initialized to 0. Thereafter, the processor 10 determines whether the image data was scanned at a specified resolution or lower (step S210). That is, the processor 10 determines, based on the scan setting used for the scanning of the image data, whether the resolution of the image data is equal to or lower than the specified resolution (for example, 200 dpi) at which the accuracy of the character recognition largely changes. The processor 10 determines scanning at the specified resolution or lower as the low-resolution scanning, and determines scanning at a resolution higher than the specified resolution as the high-resolution scanning.

When the processor 10 does not determine the scanning as the low-resolution scanning in step S210, that is, when the processor 10 determines the scanning as the high-resolution scanning in step S210, the number of characters that do not match the specified word is equal to or smaller than the predetermined number NH of characters, and a candidate character string that is accurate with a probability equal to or higher than the threshold TH is present, the processor 10 sets the flag to 1 (step S215). The threshold $T_H$ is a value larger than the threshold $T_L$. The predetermined number Nu of characters is 0 in the present embodiment. When such a candidate character string is not present, the flag for the file including the image data remains 0.

When the processor 10 determines the scanning as the low-resolution scanning in step S210, the number of characters that do not match the specified word is equal to or smaller than the predetermined number Ni of characters, and a candidate character string that is accurate with a probability equal to or higher than the threshold $T_L$ is present, the processor 10 sets the flag to 1 (step S220). The predetermined number $N_L$ of characters is 1 in the present embodiment. When the candidate character string is not present, the flag for the file including the image data remains 0.

3. Other Embodiments

The above-described embodiment is an example of the present disclosure, and other various embodiments can be applied. For example, the receiving section, the scanner, the acquiring section, the determining section, and an output section may be disposed in the same apparatus. Alternatively, at least one of the receiving section, the scanner, the acquiring section, the determining section, and the output section may be disposed in an apparatus different from an apparatus including the others of the receiving section, the scanner, the acquiring section, the determining section, and the output section.

A communication connector or an antenna that acquires data from an external apparatus such as a FAX machine may be used as the acquiring section.

The output by the processing section may be printing by another printing apparatus, FAX transmission, or data transfer to another apparatus, in addition to the printing by the multifunction peripheral 1. The output setting may include information (a destination FAX number, information of an output destination printer, or information (shared folder name) of a transfer destination apparatus) of an output destination and an output file format.

In the multifunction peripheral 1 according to the above-described embodiment, when a power source of the multifunction peripheral 1 is turned off after scanning is performed in accordance with the scan setting and before output according to the output setting is completed, the power source of the multifunction peripheral 1 may be turned on after being turned off and the multifunction peripheral 1 may perform outputting. Therefore, the determining section stores a determination result to the storage medium. In the above-described embodiment, the "determination result" is a flag associated with image data. When image data that is not yet output at the time of the start of the multifunction peripheral 1 is present, the processing section outputs the image data based on the determination result read from the storage medium. That is, when image data associated with a flag indicating 1 is present at the time of the restart of the multifunction peripheral 1, the output (printing) of the image data can be determined as not being completed. The processing section can reliably perform outputting according to an output setting since the processing section outputs the image data associated with the flag indicating 1 after the restart of the multifunction peripheral 1.

The determining section is not limited to a section that performs optical character recognition on image data to recognize a character string included in the image data from an image of a character included in an image of the image data. The determining section may recognize and determine a character string included in image data based on the position of a check in a mark sheet included in an image of the image data, or may determine whether a word is included as digital data within acquired data.

Although the determining section refers to the number of characters that do not match a specified word, and determines whether a character string is the specified word, the determining section may refer to the number of characters that match the specified word, or refer to the ratios of the number of characters that do not match a specified word and the number of characters that match the specified word to the number of characters of the specified word so as to determine whether a character string is the specified word. In each of the above-described cases, the determining section does not determine, as a specified word, a character string having a small number of characters that match the specified word.

The configuration in which the determining section outputs a number of candidate character strings (candidate character strings as a result of character recognition) according to the scan setting can be applied to not only a scanning system having a function of determining whether a specified word is included in image data as in the above-described embodiment, but also a general scanner having a character recognition function, various apparatuses that perform character recognition on image data output from a scanner, and a character recognition program. In addition, a number of candidate character strings according to the scan setting may be output and presented to a user by, for example, displaying the candidate character strings according to the scan setting on the display. Alternatively, in a configuration in which other processing is performed using a result of character recognition, a number of candidate character strings according to the scan setting may be output to a processing block for the other processing. Although the rate of character recognition may vary depending on the scan setting, a number of candidate character strings according to the scan setting are presented to the user, and thus a number of candidate character strings that vary depending on the scanning resolution are recognized by the user as a result of the character recognition. In addition, a number of candidate character strings according to the scan setting are output to the processing block for the other processing, and thus the processing block for the other processing can perform the other processing using a number of candidate character strings that vary depending on the scanning resolution.

In the configuration in which a candidate character string that is obtained as a result of the recognition and is accurate with a probability equal to or higher than the threshold is output, the threshold when the low-resolution scanning is performed is set to be lower than the threshold when the high-resolution scanning is performed, and a number of candidate character strings according to the scan setting may be output. In this case, it is possible to increase a probability that a larger number of candidate character strings than the number of candidate character strings obtained when the high-resolution scanning is performed can be output when the low-resolution scanning is performed, and it is possible to reduce a possibility that a character string originally included in image data is not extracted by the user for which a candidate character string was output, or is not extracted in the processing block for the other processing.

The determining section may be configured to change the number of candidate character strings to be output according to a color setting for scanning. The rate (the ratio of the number of characters accurately recognized to the number of all characters of a specified word) of the character recognition performed when monochrome scanning is performed may be lower than the rate of the character recognition performed when color scanning is performed in the color mode (color setting for scanning) and the rate of the character recognition performed when gray-scale scanning is performed. When a scanner that has such characteristics is disposed in the multifunction peripheral 1, the determining section may be configured to output a larger number of candidate character strings when scanning is performed according to a color setting in which the accuracy of the character recognition is set to a low level than the number of candidate character strings output when scanning is performed according to a color setting in which the accuracy of the character recognition is set to a high level that is higher than the low level. In this configuration, it is possible to increase a probability that all candidate character strings can be output.

In addition, the determining section may be configured to change the number of candidate character strings to be output according to the compression rate of image data. The rate (the ratio of the number of characters accurately recognized to the number of all characters of a specified word) of the character recognition tends to decrease as the compression rate of the image data is increased. Therefore, the determining section may be configured to output a larger number of candidate character strings when the image data is compressed at a high compression rate than the number of candidate character strings output when the image data is compressed at a low compression rate. In this case, it is possible to increase a probability that all the candidate character strings can be output.

In the above-described embodiment, the scanning system includes the processing section that performs processing in accordance with a specified high-order word when image data includes the specified high-order word and does not include a specified low-order word, and performs processing in accordance with the specified low-order word instead of the specified high-order word when the acquired image data includes the specified low-order word as an example. However, the processing section may be disposed in a system or an apparatus other than the scanning system. A target that is determined whether to include a specified word may be image data subjected to the character recognition or may be text data instead of image data. When the system or the apparatus includes the processing section, the user can cause the system or the apparatus to perform processing corresponding to the specified high-order word on data including the specified high-order word and not including the specified low-order word, and can cause the system or the apparatus to perform processing corresponding to the specified low-order word on data including the specified low-order word.

When the receiving section is configured to receive units in which image data is divided into different files, the units are not limited to units of one page. For example, the image data may be divided into files in units of 10 pages. In addition, for example, the image data may be divided into files based on whether a color of the original is a special color. In addition, for example, when page numbers in image data can be recognized and scanned such that the page numbers are arranged in ascending order, the image data may be divided into files for pages with page numbers reset to 1 and the subsequent numbers and files for pages preceding the page with the page number 1.

The present disclosure can be applied as a program, a simple method, a production method that are executed by a computer. For example, the present disclosure is implemented as a data processing program for causing a computer to function as a receiving section that receives, from a storage medium, a specified high-order word and a specified low-order word that includes the specified high-order word and is longer than the specified high-order word, an acquiring section that acquires data, a determining section that determines whether the acquired data includes the specified high-order word or whether the acquired data includes the specified high-order word and the specified low-order word, and a processing section that performs processing in accordance with the specified high-order word when the acquired data includes the specified high-order word and does not include the specified low-order word, and performs processing in accordance with the specified low-order word instead of the specified high-order word when the acquired data includes the specified low-order word.

In addition, for example, the present disclosure is implemented as a method for producing output matter. The method for producing output matter includes acquiring data, producing output matter processed in accordance with a specified high-order word when the acquired data includes the specified high-order word and does not include a specified low-order word that includes the specified high-order word and is longer than the specified high-order word, and producing output matter processed in accordance with the specified low-order word instead of the specified high-order word when the acquired data includes the specified low-order word. The output matter is, for example, printed matter, processed data, or the like.

The system, the program, and the method described above may be implemented as a single apparatus or may be implemented using components included in a plurality of apparatuses. The system, the program, and the method described above include various aspects. The system, the program, and the method described above can be modified to be partially software and partially hardware as appropriate. Furthermore, the present disclosure may be implemented as a storage medium storing a program for controlling the system. The storage medium storing the program may be a magnetic storage medium or a semiconductor memory. Any storage medium that will be developed in the future can be considered in exactly the same way as the storage medium described above.

What is claimed is:

1. A data processing system comprising:
   a storage medium that stores
      a first word with a first character string,
      a second word with a second character string, with the second character string entirely including the first character string and is longer than the first character string,
      a first print setting in association with the first word, and
      a second print setting in association with the second word;
   a processor that acquires data and determines whether the acquired data includes the first word and the second word; and
   a printer that
      performs a first print processing in accordance with the first print setting when the acquired data includes the first word and does not include the specified low order second word, and
      performs a second print processing in accordance with the second print setting when the acquired data includes the second word.

2. The data processing system according to claim 1, wherein
   the first print processing includes the second print processing.

3. The data processing system according to claim 2, wherein
   the first print processing includes processing that is performed in accordance with all specified words that include the first character string and are longer than the first character string.

4. The data processing system according to claim 1, wherein
   the first word is automatically generated from a common part of a plurality of different words that are stored in the storage medium, the different words having different character strings that entirely include the first character string and are longer than the first character string, respectively.

5. The data processing system according to claim 1, wherein
   the first word and the second word include character strings representing organization names.

6. A non-transitory computer-readable storage medium storing a data processing program for causing a processor of a computer to:
   read, from a storage medium,
      a first word with a first character string,
      a second word with a second character string, with the second character string entirely including the first character string and is longer than the first character string,
      a first print setting in association with the first word, and
      a second print setting in association with the second word;
   acquire data and determine whether the acquired data includes the first word and the second word; and
   cause a printer to
      perform a first print processing in accordance with the first print setting when the acquired data includes the first word and does not include the second word; and
      perform a second print processing in accordance with the second print setting when the acquired data includes the second word.

7. A method for producing output matter, the method comprising:
- storing, by the storage medium,
  - a first word with a first character string,
  - a second word with a second character string, with the second character string entirely including the first character string and is longer than the first character string,
  - a first print setting in association with the first word, and
  - a second print setting in association with the second word;
- acquiring, by a processor, data and determining whether the acquired data includes the first word and the second word;
- performing, by a printer, a first print processing in accordance with the first print setting when the acquired data includes the first word and does not include the second word; and
- performing, by the printer, a second print processing in accordance with the second print setting when the acquired data includes the second word.

8. The data processing system according to claim 5, wherein
- an organization indicated by the second word is a constituent element of an organization indicated by the first word.

* * * * *